United States Patent [19]

Tesler

[11] 3,896,487

[45] July 22, 1975

[54] COMPATIBLE STEREOSCOPIC COLOR TELEVISION SYSTEM

[76] Inventor: Vladimir Efimovich Tesler, prospekt Mira, 91, kv. 120, Moscow, U.S.S.R.

[22] Filed: Aug. 2, 1973

[21] Appl. No.: 384,978

[52] U.S. Cl. .................... 358/3

[51] Int. Cl. .................... H04n 9/00

[58] Field of Search .............. 178/5.2 R, 5.4 R, 6.5; 358/3

*Primary Examiner*—Robert L. Richardson

[57] ABSTRACT

A compatible stereoscopic colour television system with phase-difference quadrature modulation of the colour subcarrier by the chrominance signals of the first image of the stereo pair and transmission of the signals of the second image of the stereo pair on a subcarrier located in the frequency spectrum of the luminance signal, according to the invention, the system is characterized by the fact that the luminance signal of the second image of the stereo pair is employed for effecting additional modulation of the subcarrier so that the amplitude of the latter in one line is equal to the sum of the amplitude of the modulating signal and the square root from the amplitude of thel quadrature modulated subcarrier, whereas in the other line it is equal to the difference of these amplitudes; the additional modulation is carried out with conservation of the phase difference of the subcarrier in the adjacent lines; during the reception the chrominance signals of the first image of the stereo pair are separated by way of multiplying the delayed and undelayed voltages of the subcarrier directly for one signal and with an additional 90° phase shift for the other signal, the chrominance signals of the second image of the stereo pair being separated by way of detecting the delayed and undelayed voltages and obtaining the difference of their envelopes.

6 Claims, 22 Drawing Figures

COMPATIBLE STEREOSCOPIC COLOR TELEVISION SYSTEM

The present invention relates to compatible stereoscopic colour television systems and can be used for telecasting through ground and cosmic communication lines or in special television systems. Besides the main purpose — stereoscopic transmission — the proposed system is suitable for transmitting complementary information, for example in video telephone, phototelegraphy, etc., together with the signals of non-stereoscopic television.

The known methods of transmitting complementary information in a television signal are base on a method of inserting a subcarrier voltage in the luminance component frequency spectrum, said voltage being modulated either by one video signal (SECAM) or by two independent video signals (NTSC, PAL, NIIR, LEIS — Leningrad Communications Electrical Engineering Institute). In order to reproduce a stereoscopic colour picture at the receiving side, it is necessary to have four to six independent video signals (or linear combinations thereof), which exdeeds the number (three as maximum) of independent signals transmitted at a time by the known method, in the LEIS stereoscopic colour television system the fourth video signal (luminance component of the second image of the stereo pair) is transmitted at the expense of reducing the period of transmission of the chrominance signals. During the time of scanning of one line, the subcarrier is quadrature modulated by one of the chrominance signals (for example "R-Y") and by the additional video signal, during the next line it is modulated by the second chrominance signal (for example "B-Y") and the additional signal. In principle, the additional signals in the adjacent lines can be identical or different, i.e., the total number of independent signals on the subcarrier transmitted during the time of two lines may be equal to four. The method of transmission of complementary information due to partial reduction of the time of transmission of the chrominance signals employed in the LEIS system can be modified, such as the transmission in the NTSC system of a subcarrier quadrature modulated by the chrominance signals in one line and a subcarrier quadrature modulated by the additional signals in the adjacent line; or the use of two pairs of lines for the same purpose in the PAL system. At the same time, the method of transmission of complementary information due to partial reduction of the time of transmission of the chrominance signals features some disadvantages.

The type LEIS system is highly sensitive to phase distortions of the signals of the modulated subcarrier in a communication channel, the vertical colour resolution is low, the chrominance signal decoder in a television receiver designed for reception of stereoscopic colour pictures is very complicated, since it is necessary to have simultaneously both chrominance signals (transmitted every other line) to be fed to the kinescope. Although the decrease in the vertical colour resolution and the complication of an ordinary colour television receiver will apparently be of the same order as in the ordinary (nonstereo) PAL system, yet, in contrast to the latter, this will not be compensated by the advantages of the PAL signals, i.e., lower sensitivity of the modulated subcarrier signals to the distortion in the transmission channel. A combination of the method of transmission of complementary information at the expense of partial reduction of the transmission of the chrominance signals with the "method of phase reversal from line to line" (PAL) also results in complication of an ordinary colour receiver and in a further drop of the vertical colour resolution.

The method of transmission of complementary information at the expense of partial reduction of the colour information (reduction of the time of transmission of the chrominance signals) has other disadvantages, for example deterioration of the noise immunity in the colour channel and deterioration of the compatible images on the screen of black-and-white television receivers.

It could be shown that during the transmission of colour-difference signals successively in every other line and with amplitude (including balanced) modulation of the subcarrier the peak-to-peak amplitude of the modulated subcarrier for the signals R-Y and B-Y, for example, will not undergo substantial changes compared with the peak-to-peak amplitudes of the quadrature components of the colour subcarrier in the systems NTSC, PAL, NIIR (the coefficients of compression must practically be maintained with an accuracy of up to the second sign at a specified maximum excess over the peak-to-peak amplitude of the composite colour signal of a specified value 1.33 Y). Thus, in each line there will be reproduced the same peak-to-peak amplitudes of the colour-difference signals and the noise power per two lines.

The signals of complementary information (of the image of the left, or right component of the stereo pair), unlike the colour-difference signals, do not vanish during the transmission of the "white" in the "primary" luminance signal. Therefore, the colour subcarrier in the line, where the modulation is effected by one of the chrominance signal and by the additional signal, as well as in the line, where the modulation of the subcarrier is effected only by the additional (stereo) signal, will be present also on the white level of the primary luminance signal. Practical experience in the field of colour television shows that the excess of the peak-to-peak amplitude of a composite signal on the white level is allowable within 10% (the modulation depth of television transmitters transmitting the white level is selected to be within 87.5%). Thus, the peak-to-peak amplitude modulated by the stereo component of a composite signal should not exceed approximately 20% of the peak-to-peak amplitude of the luminance signal (— 14 db). Taking into account that the peak-to-peak amplitude of the quadrature-modulated colour subcarrier in the line of the NTSC system, for example, raises up to 120%, it would be expected that there appears a pronounced difference in the brightness of the lines.

In the light of the above considerations on the deterioration of the noise immunity and the quality of compatiable black-and-white images, the combination of the method of transmission of additional signals instead of a portion of the colour-difference signals with relative quadrature modulation accepted in the NIIR system also does not look as promising. Indeed, on using in the NIIR system the amplitude modulation of the subcarrier in one of the adjacent lines (for example, in the line with a reference phase) by an additional signal (stereo), while maintaining the amplitude and phase modulation of the colour subcarrier in the adjacent line, one can obtain a signal of a colour stereo system. In this case any additional elements in the chrominance unit of an ordinary colour receiver (not stereo) are no longer necessary, since the differences in the amplitudes of the subcarrier in the linear version of the NIIR system do not manifest themselves in any distortions of colour. Yet, in this case both the compatibility and, partially, noise immunity of the colour subcarrier (the maximum peak-to-peak amplitude of the subcarrier in the reference line is approximately 20%) and the protective properties of the signals against distortions of the differential phase type in the transmission channel deteriorate, since, due to the difference in the peak-to-peak amplitudes of the composite signal in the adjacent lines, the phase shifts of the subcarrier affected by the reactive nonlinearity of the transmission channel may be dissimilar.

An object of the present invention is to provide a possibility of transmitting complementary information, such as the picture signals of the second component of a stereo pair, the frequency band of a composite colour signal while preserving the original width of this band.

Another object of the invention is to preserve, for the most part, the noise immunity of the luminance and chrominance signals of the first image of the stereo pair.

Still another object of the invention is to protect the colour subcarrier signals against distortions of the differential phase type without noticeable deterioration of the quality of compatible black-and-white and colour pictures and without compication (inclusion of any additional circuits and elements for suppressing the cross distortions from the additional information) of the chrominance unit of an ordinary television receiver (during compatible reception of stereoscopic colour programs).

This object is attained in a compatible stereoscopic colour television system with phase-difference quadrature modulation of the colour subcarrier by the chrominance signals of the first image of a stereo pair and transmission of the signals of the second image of the stereo pair on the subcarrier located in the centre of the frequency band of the luminance signal, wherein, according to the invention, the luminance signal of the second image of the stereo pair is used for additional modulation of the subcarrier so that the subcarrier amplitude in one line is equal to the sum of the amplitudes of the modulating signal and the square root from the amplitude of the quadrature-modulated subcarrier, while in the adajcent line it is equal to the difference of these amplitudes, the additional modulation having no effect on the subcarrier phases in the adjacent lines; during the reception the chrominance signals of the first image of the stereo pair are separated by multiplying the delayed and undelayed voltages of the subcarrier for one signal and with a complementary 90° phase shift therebetween for the other signal, whereas the signals of the second image are separated by detecting the delayed and undelayed voltages and obtaining the difference between their envelopes.

This provides for compatibility with black-and-white or colour non-stereoscopic television systems, as well as with black-and-white stereoscopic systems, ensures a possibility of transmission of complementary information while preserving the same frequency band of the composite signal, maintains the noise immunity of the luminance and chrominance signals of the first image of the stereo pair, protects the colour subcarrier signals against distortions of the differential phase type, provides for a low value of crosstalk from the additional signals (second image) penetrating into the chrominance channel of the first image of the stereo pair (provision of high-quality compatible colour reception of stereo programs by means of a colour television receiver without complicating its decoder unit by any additional elements for suppressing the stereo-signal interference).

In order to increase the noise immunity of the luminance component of the second image, while preserving the same protection of the chrominance signals of the first image against the cross-talk from the additional signal channel, it expedient that in the proposed system the luminance signal voltage of the second image of the stereo pair, before modulating the subcarrier, is transferred into a bipolar voltage by inserting complementary pulses with an amplitude equal to half the peak-to-peak amplitude of the luminance signal in the interval of the line blanking pulses and by clamping the level of the video signal to the tops of these pulses.

To provide for a possibility of transmitting the colour information of the second image of the stereo pair, it is also expedient to insert an additional subcarrier quadraturemodulated by two colour-difference signals (like in the NTSC system) into the frequency spectrum of the luminance signal of this image; during the reception the voltage of the additional modulated subcarrier is separated from the difference signal of the envelopes of the fundamental subcarrier by a band-pass filter and is detected in two synchronous detectors.

To improve the protection of the additional subcarrier signals against distortions of the differential phase and parasitic suppression of one sideband of modulation frequencies type in the proposed system, it is advantageous that the quadrature modulation of the additional subcarrier is effected by reversing the polarity of one the colour-difference signals from line to line (like in the PAL system), while during the reception the colour-difference signals of the second image of the stereo pair are correspondingly regenerated.

In order to simplify the process of regeneration of the chrominance signals of the second image of the stereo pair, the additional subcarrier frequency can be taken equal to half the frequency of the fundamental subcarrier, while during the reception there is shaped a reference signal for synchronous detection of the modulated additional subcarrier by dividing the frequency of the signal of the modulated fundamental subcarrier from the lines with a reference phase.

In order to simplify the receiver by eliminating the circuits and devices for generating the subcarrier reference voltage for synchronous detection from the chrominance unit of the second image of the stereo pair and to compensate for the action of the differential phase distortions on the quality of colour reproduction in the second image of the stereo pair, it is expedient that the modulation of the additional colour subcarrier is carried out by the method of the NIIR system.

Other objects and advantages of the present invention will be apparent from the following detailed description of one embodiment of the invention, reference being made to the accompanying drawings, in which.

Figure 1:
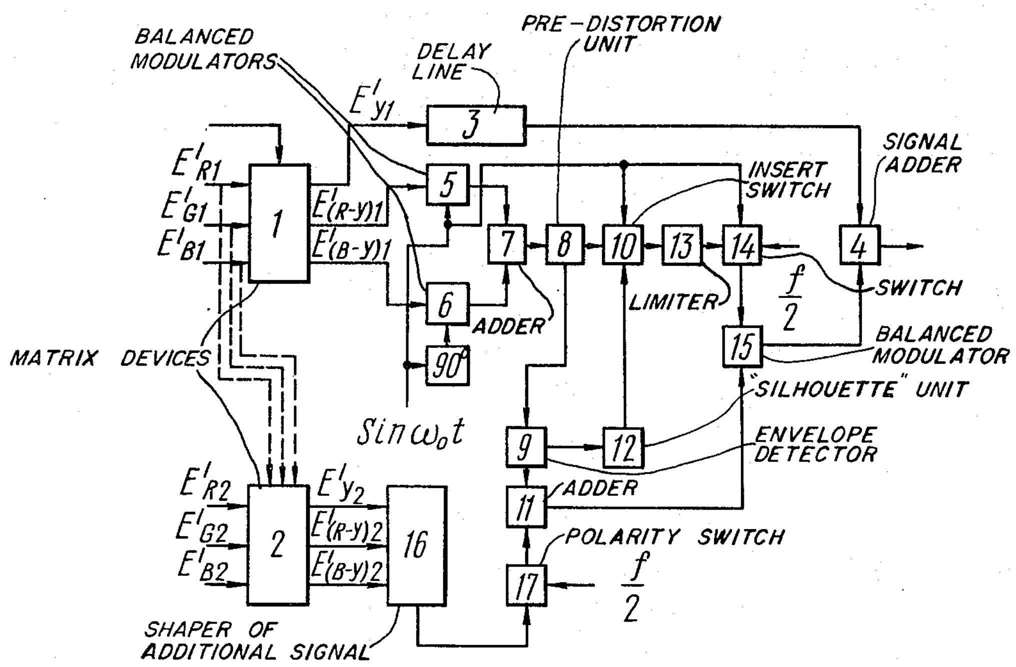
FIG. 1 shows a block diagram of the device used for shaping a signal of a compatible stereoscopic colour television system.

The essence of the invention consists in the following.

In a system with relative (phase-difference) quadrature modulation of the subcarrier and amplitude precorrection of the chrominance signals the colour-difference video signals (R-Y) and (B-Y) or Y and Q at the receiving side are separated by multiplying the subcarrier signals in the adjacent lines.

$$2\sqrt{A}\sin(\omega_o t+\gamma)\times 2\sqrt{A}\sin\omega_o t = A\cos\gamma - A\cos(2\omega_o t+\gamma)$$

$$2\sqrt{A}\sin(\omega_o t+\gamma)\times 2\sqrt{A}\cos\omega_o t = A\sin\gamma + A\sin(2\omega_o t+\gamma)$$

where

-Continued $$A=\sqrt{E_{R-Y}'^2+E_{B-Y}'^2};\ \psi=\arc\tan\frac{E'_{R-Y}}{E'_{B-Y}},\ \omega_o=2\pi f_o.$$

$E_{R-Y}$, $E_{B-Y}$ — are the colour-difference signals, $f_0$ — are subcarrier frequencies; therefore $A\cos\gamma = E_{B-Y}'$, $A\sin\gamma = E_{R-Y}'$ With similar or dissimilar variation of the amplitude of the signals of the modulated subcarrier in the adjacent lines ($\Delta U$) and with the same phase-difference between the subcarriers, for example $$(\sqrt{A}+\Delta U)\sin(\omega_o t+\gamma)$$

and $(\sqrt{A}-\Delta U)\sin\omega_o t$ the multiplication of the subcarriers in the receivers gives the components of the video frequency $$(A-\Delta U^2)\cos\psi=\left(1-\frac{\Delta U^2}{A}\right)A\cos\psi=\left(1-\frac{\Delta U}{A}\right)^2E'_{B-Y}$$

and $$(A-\Delta U^2)\sin\psi=\left(1-\frac{\Delta U^2}{A}\right)A\sin\psi=\left(1-\frac{\Delta U^2}{A}\right)E'_{R-Y}$$

i.e., the relationship between the signals $E_{R-Y}'$ and $E_{B-Y}'$ is not changed (the reproduction of the colour hues is correct) but their magnitude (saturation) drops down by $$\left(1-\frac{\Delta U^2}{A}\right)$$

times.

When $\Delta U$ is sufficiently low, for example $\Delta U=0.1A_{max}$, the decrease in the saturation is equal to 1% of the maximum value. One can easily see that in the case when $\Delta U$ is a bipolar voltage with an amplitude 0.1 $A_{max}$ (the peak-to-peak value is correspondingly 0.2 $A_{max}$), the saturation error is within 1% of the maximum value $$(\sqrt{A}\pm 0.1)(\sqrt{A}\mp 01.)\cos\gamma=(A-0.01)\cos\gamma$$

and $$(\sqrt{A}\pm 0.1)(\sqrt{A}\mp 0.1)\sin\gamma=(A-0.01)\sin\gamma,$$

while the difference of the envelopes of the subcarriers in the adjacent lines gives a bipolar voltage with an amplitude ±0.2 $A_{max}$ (i.e., with a peak-to-peak value of 0.4 $A_{max}$) exceeding the saturation change by a factor of 40.

The voltage $\Delta U$ can be employed in the form of a signal carrying information of the additional image, such as the second image of the stereo pair, for example:

— the luminance signal $E_{Y2}'$ of the second image of the stereo pair; or

— the difference video signal of the luminance components of the first and second images of the video pair $$\Delta E_Y' = E_{Y1}' - E_{Y2}';$$

or

— the composite signal consisting of a video signal $E_{Y2}'$ or $\Delta E_Y'$ multiplexed by the complementary information of the chromaticity of the second image (with the use of an additional subcarrier).

The selection of the signal employed as $\Delta U$ is preferably made under the following conditions:

— the frequency band of the additional signal may be within the limits from zero to $0.5\,f_o$, where $f_o$ is the colour subcarrier frequency (in accordance with the Kotelnikov theorem);

— the amplitude of the additional signal is not in excess of 10% (or 20% peak-to-peak value) of the maximum amplitude of the chrominance signal envelope or the peak-to-peak amplitude of the chrominance signal from the black level (to provide for the so-called "professional compatibility," i.e., the possibility of transmitting the signals through the existing T.V. channels);

— the second image must be read with the same parameters (synchronously and in-phase) as the first image, i.e., the parameters of the scanning devices used for obtaining the main (first-image) signals and the additional (secondimage) signals must be identical (to provide for the least cross-talk between the signals).

The fulfilment of the last condition is not obligatory but is desirable by two reasons:

— when the parameters of the scanning systems of both images are the same, more accurate alternation of the spectra of the main and additional signals can be obtained, thus reducing the cross-talk therebetween;

— in the general case in a television picture the best correlation (therefore, the least difference) is between the elements lying side-by-side along the line, as well as between those lying side-by-side in the direction normal to the direction of line scanning (i.e., between the elements of the adjacent lines having the same number, starting from the origin of each line). The cross-talk betwteen the fundamental and additional signals will be determined by the differences between the elements of each signal adjacent along the vertical. This can easily be seen by introducing the following designations $E_{Y(1)}^*$, $E_{Y(2)}^*$, $\sqrt{A}_{(1)}$, $\sqrt{A}_{(2)}$, $\Delta U_{(1)}$ and $\Delta U_{(2)}$, where $E_Y^*$ is the signal of the components $E_Y$ in the chrominance band, $\sqrt{A}$ is the amplitude of the colour subcarrier modulated by the colour-difference signals; $\Delta U$ is the signal of the additional image; (1) and (2) are the indices of the adjacent lines characterized by the given parameter.

When the chrominance signals are separated in the absence of the additional signal $\Delta\ U$, the true colour saturation (the luminance-chrominance cross-talk is neglected) is determined by the value $\sqrt{A_{(1)} \cdot A_{(2)}}$.

In the presence of the additional signals the saturation will be proportional to $$\sqrt{A}_{(1)} \cdot \sqrt{A}_{(2)} + (\Delta U_{(1)} \sqrt{A}_{(2)} - \Delta U_{(2)} \sqrt{A}_{(1)}) - \Delta U_{(1)} \cdot \Delta U_{(2)}$$

or, taking $A_{(1)} \approx A_{(2)} \approx A$ and making allowance for a low value of the product $$\Delta U_{(1)} \cdot \Delta U_{(2)} (\Delta U_{(1)} \leq 0.1 A_{max} \text{ and } \Delta\ U_{(2)} \leq 0.1 A_{max}) \approx A + (\Delta U_{(1)} - \Delta U_{(2)}) - \sqrt{A} - 0.01 A_{max})$$

Since $\Delta\ U = 0.1 E(t)$, where $E(t)$ is the amplitude of the signal of the second image, the amplitudes of the colour-difference signals separated in the receiver will be proportional.

$$A + 0.1\ \Delta E(t)\ \sqrt{A} - 0.01 A_{max},$$

where $$\Delta\ E(t) = E_{(1)}(t) - E_{(2)}(t)$$

is the difference in the amplitudes of the elements of the second image adjacent along the vertical.

The absolute value of the signal of the second image is within the range of $0 \leq E(t) \leq A_{max}$; correspondingly, $-|\Delta E(t)| \leq A_{max}$; $\Delta\ E_{min}(t) = 0$ in the absence of the horizontal transition in the second image, when $E_{(1)}(t) = E_{(2)}(t)$ and $\Delta\ E_{max}(t) = \pm A_{max}$, when one of the signals $E_{(1)}(t)$ or $E_{(2)}(t)$ is equal to zero, while the absolute value of the second signal is equal to $A_{max}$. The maximum error in the amplitudes of the colour-difference signals (saturation) will be with $\Delta\ E(t) = -A_{max} \approx A - 0.1 A_{max}( \sqrt{A} + 0.1)$.

Taking into account that in the relative scale $A_{max} = 1$ and $|\Delta E(t)| \leq 0.5 A_{max}$ on the average, we can in the general case write the expression for the saturation in the form $$A \left[1 + \frac{0.05}{A}(\pm \sqrt{A} - 0.1)\right]$$

The cross-talk from the additional signal to the chrominance channel are maximum during the horizontal transition in the second image, the cross-talk from the main signals to the second image channel will be maximum during the horizontal transition in the first image. Instead of the correct signal $0.2E(t)$ there will be separated a video signal $0.2E(t) + ( \sqrt{A}_{(1)} - \sqrt{A}_{(2)}) + (E_{Y(1)}^* - E_{Y(2)}^*) = 0.2E(t) + \Delta \sqrt{A} + \Delta E_Y^*$.

Since during the multiplication of the subcarrier signals (separation of the colour-difference signals in the receiver) the delay time $\tau' = \tau_{line\ main}$, while during the separation of the additional signal $\Delta U$ it is necessary to express the difference of the values of the amplitude envelope through the time $\tau'' = \tau_{line\ add.}$. Thus, the cross-talk in the chrominance channel caused by the additional signal should be expressed in the form $$E_{(1)}(t) = E(t_o),\ E_{(2)}(t) = E(t_o + \tau_{line\ main})$$

and $$\Delta\ E(t) = E(t_o) - E(t_o + \tau_{line\ main})$$

Correspondingly, the cross-talk due to the main signals in the channel of the additional (second-image) signal are expressed through $$\Delta \sqrt{A} = \sqrt{A(t_o)} - \sqrt{A(t_o + \tau_{line\ add})}$$

and $$\Delta\ E_Y^* = E_Y^*(t_o) - E_Y^*(t_o + \tau_{line\ add.})$$

The best correlation between the value of the signals (correspondingly, the least values $\Delta E(t)$, $\Delta E_Y^*$ and $\Delta \sqrt{A}$) in the general case) will be with $\tau_{line\ add} = \tau_{line\ main}$.

The shaping of a composite stereoscopic signal in the proposed system can be effected, for example, by means of a coder whose simplified block diagram is shown in FIG. 1.

The signals from a stereo-colour image transmitter, for example, signals $E_{R1}'$, $E_{G1}'$, $E_{B1}'$ (the first image of the stereo pair) and $E_{R2}'$, $E_{G2}$, $E_{B2}'$ (the second image of the stereo pair), as well as the necessary pulses from a synchrogenerator (shown by an arrow in FIG. 1) are fed to the corresponding inputs of the matrix devices 1 and 2, in which there are generated video signals $E_{Y1}'$, $E'_{(R-Y)1}$, $E_{(B-Y)1}'$ and $E_{Y2}'$, $E_{(R-Y)2}'$, $E_{(B-Y)2}'$.

From the output of the matrix device 1 the signal $E_{Y1}'$ through a delay line 3 is fed to one of the inputs of a composite video signal adder 4. The video signals $E_{(R-Y)1}'$ and $E_{(B-Y)1}'$ from the outputs of the matrix device 1 are fed to the inputs of balanced modulators 5 and 6 which are also fed with colour-subcarrier voltages having a frequency $\omega_o$, said signals being supplied in a corresponding phase. The balance-modulated voltages from the outputs of the modulators 5 and 6 are added in the adder 7 thus forming a quadrature-modulated signal of a colour subcarrier whose amplitude is pre-distorted by the square-root law in a unit 8. From the pre-distortion unit 8 the signals of the modulated subcarrier are fed simultaneously to the input of an envelope detector 9 and an insert switch 10. The envelope voltage of the video signal from the output of the detector 9 is fed to the input of an adder 11, where it is summed up with the additional signal voltage and also to a silhouette unit 12. In the silhouette unit 12 from the input video signal of the envelope there are produced square pulses whose amplitude is constant, when the envelope voltage of the quadrature-modulated subcarrier is non-zero, and is zero during the transmission of the grey hues (the envelope is equal to zero). The pulse signal from the silhoutte unit 12 controls the operation of the insert switch 10, one input of which is fed with a signal of the modulated subcarrier from the output of the amplitude predistortion unit 8 and the other input is fed with the reference subcarrier voltage. From the output of the switch 10 the colour subcarrier signal with the inserts of the reference subcarrier (when the quadrature-modulated subcarrier is equal to zero) is fed to a limiter 13 in which the amplitude modulation of the subcarrier is suppressed. From the output of the limiter 13 the subcarrier through the switch 14, whose second input is acted on by the reference subcarrier voltage, is fed every other line to a balanced modulator 15; during the second line the balanced modulator 15 is fed with the reference subcarrier voltage from the switch 14. In the balanced modulator 15 the subcarrier is modulated by the summary signal (of the envelope and the additional image) fed from the output of the adder 11. From the output of the modulator 15 the signals of the modulated subcarrier are fed to the composite signal adder 4, from the output of which the television signal is fed to a transmitter, for example, the video signals $E_{Y2}'$, $E_{(R-Y)2}'$, $E_{(B-Y)2}'$ from the output of the matrix device 2 are fed to a shaper 16 for producing an additional signal $\Delta U$. From the output of the shaper 16 the additional signal $\Delta U$ through a polarity switch 17 is fed to the adder 11, where it is summed up with the video signal of the envelope. A modification is possible, where the matrix device 2 produces not the signals $E_{Y2}'$, $E_{(R-Y)2}'$, $E_{(B-Y)2}'$, but other signals, for example, $\Delta E_Y' = E_{Y2}' - E_{Y1}'$ $\Delta E_{R-Y}' = E_{(R-Y)2}' - E_{(R-Y)1}'$ $\Delta E_{B-Y}' = E_{(B-Y)2}' - E_{(B-Y)1}'$ For this purpose, the matrix device 2 must be also fed with signals $E_{R1}'$, $E_{G1}'$, $E_{B1}'$ (*shown by dashed lines in FIG. 1*).

The block diagram of the shaper 16 for producing the additional signal depends substantially on what particular signal is selected as an additional signal. There a number of modifications is possible, for example, — the luminance component of the additional signal is the video signal $K_1E_{Y2}'$ handled correspondingly (converted into a bipolar signal);

— the luminance component is taken in the form of a signal $K_2\Delta E_Y' = K_2(E_{Y2}' - E_{Y1}')$, where $K_{1,2}$ are the compression coefficients for the luminance signal;

—chrominance signals $K_3E_{(R-Y)2}'$, $K_4E_{(B-Y)2}'$ or $K_3\Delta E_{(R-Y)}'$, $K_4\Delta E_{(B-Y)}'$ (where $K_3$ and $K_4$ are the compression coefficients), are either transmitted on an additional subcarrier or not transmitted (the second image of the stereo pair is black-and-white).

The transmission of the Δ-signals reduces the noise immunity, since during the matrixing in the receiver there is produced, for example, $$\underline{0.2\Delta E_Y' + \bar{U}_{n2} + 0.2E_{Y1}'}\ 0.2\bar{U}_{n1} = 0.2E_{Y2}' + \sqrt{\bar{U}_{n2}^2 + 0.04\bar{U}_{n1}^2},$$

where $\bar{U}_{n1}$ is the noise in the channel $E_{Y1}$, $\bar{U}_{n2}$ is the noise in the channel of the additional signal.

Thus, in the receiver there is produced the signal $$\approx 0.2E_{Y2} + \bar{U}_{n2} + 0.02\bar{U}_{n1}/\bar{U}_{n2},$$

while during the transmission of the handled signal $E_{Y2}'$ there can be produced an additional signal $$0.4E_{Y2} = \bar{U}_{n2}$$

At the same time, the transmission of $\Delta E_Y$ is more advantageous from the viewpoint of the quality of compatible black-and-white pictures, i.e., the subcarrier will not present at the uncoloured parts of some large details $\Delta E_Y' = 0$.

The signal $K_2\Delta E_Y'$ is bipolar and, in accordance with the predetermined levels of the additional signal $\Delta U$, is equal to $$K_2\Delta E_Y' = 0.1E_{Y2}' - 0.1E_{Y1}'.$$

Figures 2A, 2B:
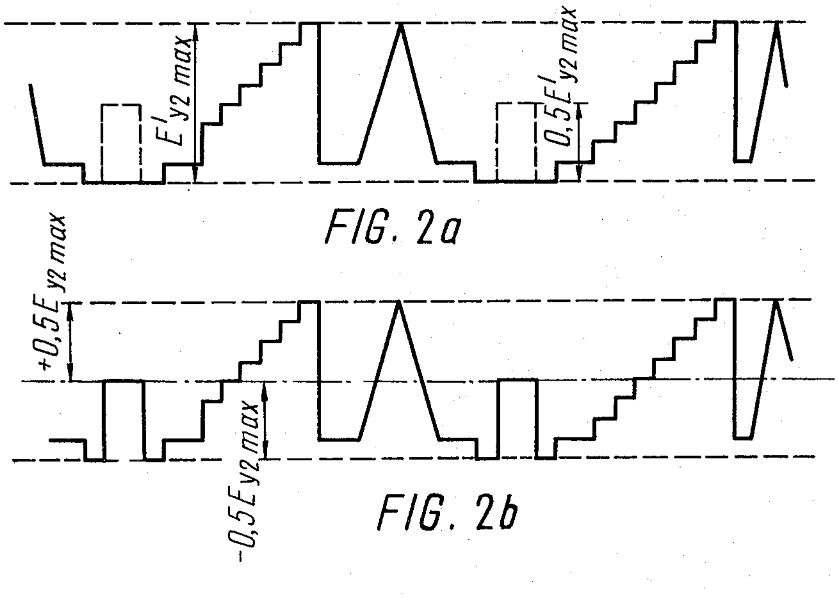
FIG. 2 ($a$ and $b$) shows the time diagram of generation of unipolar voltage from a unipolar video signal, i.e., the luminance of the second image of the stereo pair (curves $a$ and $b$)

The bipolar voltage of the same peak-to-peak value can be obtained from the signal $E_{Y2}'$, for example, by inserting a special positive pulse having a peak-to-peak amplitude $0.5E_{Y2max}$ into the line blanking interval, as shown in FIG. 2*a*, with clamping to this level (FIG. 2*b*).

Figures 3A, 3B, 3C, 3D:
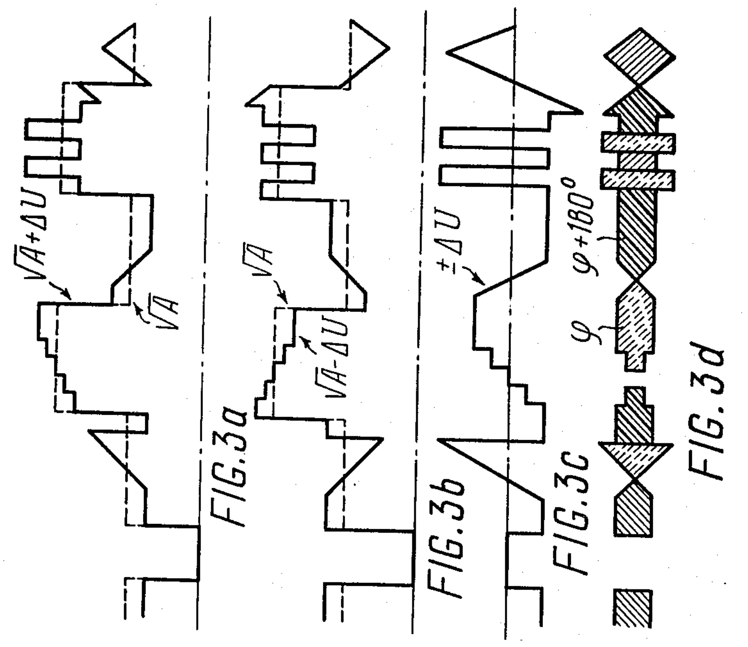
FIG. 3 ($a$–$d$) shows the diagrams of the envelope of the colour subcarrier; the curves $a$ and $b$ — in cases when the envelope of the quadrature-modulated subcarrier is higher or equal to 10% of the maximum value (two lines); the curves $c$ and $d$ — in cases when the envelope of the quadrature-modulated subcarrier is less than 10% of the maximum value.

The use of a bipolar voltage with a peak-to-peak amplitude of ±0.1 of the maximum value as an additional signal, compared with the use of a unipolar signal with a peak-to-peak amplitude of 0.1, gives an advantage of approximately 6 db by the noise immunity, while the cross-talk in the chrominance channel is kept at a level of 0.01 of the maximum saturation. At the same time, there appear certain complications: until $\sqrt{A} \geq 0.1A_{max}$ ($A_{max} = 1 = \sqrt{A}_{max}$ in conditional units), the difference $$\sqrt{A} \pm \Delta U \geq 0$$

and the shape of the envelope of the signals of the modulated subcarrier corresponds to the curves *a* and *b* shown in FIGS. 3*a* and 3*b*. Consequently, these signals can be detected by an amplitude detector (envelope separator), while the difference in the envelopes gives an additional video signal $\pm 0.2E(t)$ with a shifted direct component (the curve *c* in FIG. 3c).

It should be noted that when $\sqrt{A} < 0.1\ A_{max}$, the difference $\sqrt{A} \pm \Delta U$ can be less than zero. In this case the subcarrier envelope (the curves *d* in FIG. 3*d*) does not correspond to the shape of the signal *Et*) with a shifted direct component but corresponds to the absolute value of the bipolar modulating voltage (balanced modulation). Therefore, the signal in the receiver can be detected only with an addition to the subcarrier (in this case modulated in phase in one line and with a constant phase in the other line of the subcarrier). When $\sqrt{A} \pm \Delta U \geq 0$, such addition is effected directly at the transmitting side, since the subcarrier phase is not changed by 180° regardless of the content of $E(t)$. In principle, the addition of subcarrier without shifting the phase by 180° is possible at the receiving side, for example, by successively doubling the subcarrier frequency and halving the doubled frequency, as it is provided in the PAL receiver. Yet, this is associated with considerable complication of the decoder circuit. Consequently, it is probably expedient to add the subcarrier directly in the coder, thus preserving the simplicity of decoding the signals in the receiver.

Figures 4A, 4B, 4C, 4D, 4E:
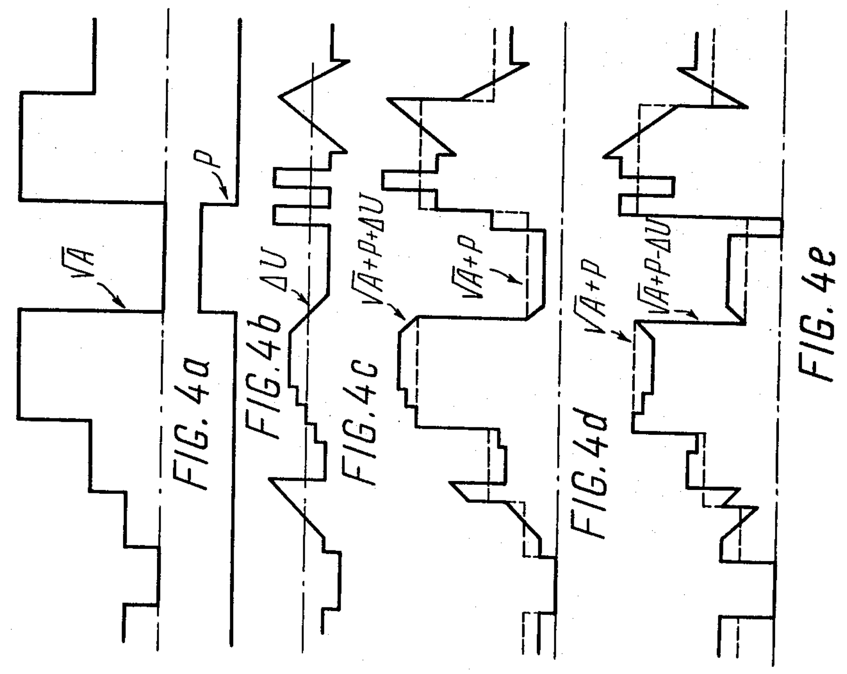
FIG. 4 ($a$–$e$) shows the oscillograms, where the curve $a$ is the envelope of the quadrature-modulated voltage after the amplitude pre-distortion and detection: curve $b$ is the pedestal voltage; curve $c$ corresponds to the additional signal; curves $d$ and $e$ are the colour subcarrier envelope in the adjacent lines.

Since the addition to the subcarrier occurs when $\sqrt{A} \geqq 0.1\ A_{max}$, it is necessary to add the subcarrier or, which is just the same, to provide for the abcence of negative half waves (180° phase shift) in the additional video signal modulating the subcarrier when $\sqrt{A} < 0.1\ A_{max}$. This can be made, for example, during the period when $\sqrt{A} \approx 0$ (the saturation is below 1%) by inserting a special pedestal for the signal $\Delta\ U$, thus making the pedestal voltage to be $\rho \pm U \geqq 0$, i.e., the envelope signal in the absolute value would always be equal to or higher than zero before being fed to the third balanced modulator. Such a pedestal voltage can be generated by means of the silhouette signal produced in the unit 12 (FIG. 1). In FIG. 4*a* the curve *a* corresponds to the envelope of the quadrature modulated colour subcarrier (from the output of the amplitude pre-distortion unit 8) after having been detected by the detector 9. The curve *b* (FIG. 4*b*) corresponds to the pedestal voltage $P = 0$ when $\sqrt{A}\quad 0.1\ A_{max}$ and $P = 0.1 A_{max}$ when $\sqrt{A} < 0.1\ A_{max}$. This voltage can be obtained, for example, by substracting the silhouette pulses from the d-c voltage and by limiting the amplitude of the colour-difference signal. The curves *c* and *d* (FIGS. 4*c* and 4*d*) correspond to the total voltage of the chrominance envelope, pedestal and additional signal (in two adjacent lines); the curve *e* (FIG. 4*e*) corresponds to the additional signal.

Introduction of achromatic colours such as white, with a pedestal voltage equal to 0.1 $A_{max}$ results in that during the transmission of white details in the composite signal to peak-to-peak amplitude of the signal is equal to $$E_{Y\ white}' + \rho \pm '\ U = 1 + 0.1 \mp 0.1 = 1_{+0.1}\ ^{-0}\ ^{0}$$

i.e., the peak-to-peak amplitude can exceed the rated level by 20%, what may appear undesirable.

This can be avoided, for example, by using nonlinear pre-correction of the signals:

— the fundametnal luminance signal is limited in the coder at a level 0.95 (instead of 1.0); since the signal is reduced only partially, the noise immunity will be deteriorated only on the white level approximately by 0.5 db, which is insignificant; also insignificant is the decrease in the luminance of the white level during the compatible reception $-B^1 = 0.95^2 = 90.25\% B_{max}$, i.e., below 10% (it is by a factor of 1.5 less than the tolerance for the differential gain in the channels);

— the amplitude of the subcarrier modulated by the additional signal during the transmission of the white is reduced by a quick-acting gain control circuit to a value of 0.15 $A_{max}$ (instead of 0.2 $A_{max}$); the control of the AGC circuit in the coder and the inverted AGC circuit in the receiver is effected by the main luminance signal when the latter overpasses a predetermined value (threshold network); in this case the noise immunity of the additional signal is reduced by 2.5 db during transmission of the white level.

Figures 5, 6:
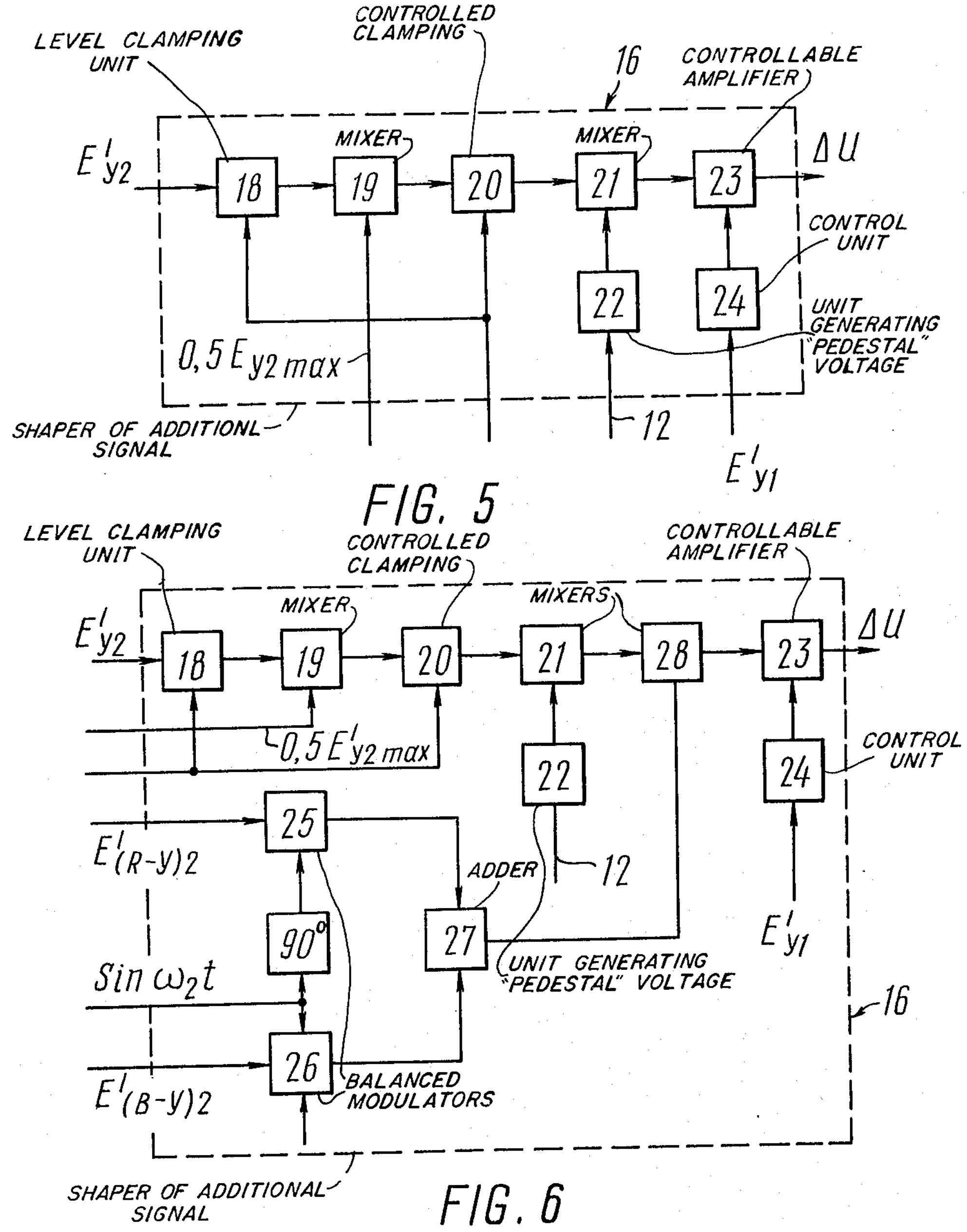
FIG. 5 shows a simplified block diagram of shaping the luminance component of thee additional signal.
FIG. 6 shows a simplified block diagram of shaping the additional signal with insertion of a second subcarrier modulated by the NTSC method.

Such an additional signal carrying information of the luminance relations of the second image of the stereo pair, in accordance with the proposed system, can be produced, for example, by a shaper 16 (FIG. 1) whose block diagram is given in FIG. 5.

The signal $E_{Y2}$ from the matrix device 2 (FIG. 1) is fed to a level clamping unit 18 which is also fed with reference pulses (shown by an arrow); thereafter, the signal $E_{Y2}'$ is added to the grey pulse equal to 0.5 $E_{Y2}'{}_{max}$ (the peak-to-peak amplitude of $E_{Y2}'$ from the black level to the white level), the grey pulse being fed during the line blanking interval. From the output of the mixer 19 the video signal containing the grey pulses passes through a controlled clamping 20, assuming a shape shown in FIG. 2, and is fed to a mixer 21 with a pedestal voltage which is generated in a unit 22 from the silhouette signal from the unit 12 in FIG. 1. From the output of the mixer 21 the signal is fed to a controllable amplifier 23 whose relative transmission coefficient varies from $K$ to 0.75 $K$ depending on the supply of the control voltage from the unit 24. In the absence of the control voltage from the unit 24 the transmission coefficient of the amplifier is equal to $K$, when the signal is fed from the unit 24, the transmission coefficient of the amplifier 23 is equal to 0.75 $K$. The unit 24 fed with the signal $E_{Y1}'$ operates in such a manner that it produces a control signal when the signal $E_{Y1}'$ applied to its input exceeds a certain (threshold) value, for example, $(0.9 - 0.95) E_{Y1\ max}$.

In order to have both images of the stereo pair in colour, the composite signal must also contain the components $E_{(R-Y)2}'$ and $E_{(B-Y)2}'$. These colour-difference signals can be included into the additional voltage $\Delta\ U$ by using the known methods of multiplexing the luminance component with the colour information transmitted on the subcarrier. When selecting the method of transmission of $E_{(R-Y)2}'$ and $E_{(B-Y)2}'$ on the additional subcarrier disposed, for example, in the frequency spectrum $E_{Y2}'$, it should be taken into account that at the receiving side the complementary information (the second image signal) must be separated as the sum $$\Delta U_1 - (\Delta U_2) = U_1 + U_2$$

Therefore, it is necessary to shape the signals on the additional subcarrier in such a way that when they are summed up during the time of two lines, the resultant signal would be suitable for shaping the signals of the additional colour subcarrier (for example, according to the method employed in the NTSC system) or by the PAL method. In the first case (NTSC method) the expressions for additional signals $\Delta\ U$ in the adjacent lines must have the form $\Delta U_n = 0.2 E_{Y2}' + 0.2 E_{(R-Y)}{}'\cos 107_2 t + 0.2 E_{(B-Y)2}'\sin \omega_2 t$, $\Delta U_{n+1}\ 0.2 E_{Y2}' + 0.2 E_{(R-Y)2}'\cos \omega_2 t + 0.2 E_{(B-Y)2}'\sin \omega_2 t$, where $E_{(R-Y)2}'$ and $E_{(B-Y)2}'$ are the gamma corrected colourdifference signals $E_{(R-Y)2}'$ taken with the required compression conefficients; $n$ and $n + 1$ are the numbers of the scanning lines; $\omega_2$ is the second subcarrier frequency.

In this case, after substracting the envelope signals in the receiver, we have the signal $$\Delta U_n - (-\Delta U_{n+1}) = 0.4 E_{Y2}' + 0.4 E_{(R-Y)2}'\cos \omega_2 t + 0.4 E_{(B-Y)2}'\sin \omega_2 t,$$

the chrominance components thereof being filtered out and fed to the snychronous detectors, as in a receiver of the NTSC system.

A disadvantage of such coding of the chrominance signals of the second component of the stero pair is the sensitivity of the colour subcarrier signals to distortions of the differential phase type, inherent in the NTSC method, as well as to parasitic suppression of one sideband of the modulated signal.

In order to reduce the parasitic influence of such distortions of the signals modulated by an additional colour subcarrier, one can use the PAL-type modulation.

In this case the expressions for the additional signals in the adjacent lines can generally be written in the following form (without taking into account the phase reversal from line to line when $\omega_R$ is not a harmonic of the line frequency):

$\Delta U_{4n} = 0.2E_{Y2}' + K_R E_{(R\text{-}Y2)'}'\cos\omega_2 t + K_B E_{(B\text{-}Y)2}'\sin\omega_2 t$ $\Delta U_{4n+1} = 0.2E_{Y2}' + K_R E_{(R\text{-}U)2}'\cos\omega_2 t - K_B E_{(B\text{-}Y)2}' sin\omega_2 t$ $\Delta U_{4n+2} = 0.2E_{Y2}' - K_R E_{(R\text{-}Y)2}'\cos\ \omega_2 t - K_B E_{(B\text{-}Y)2}' sin\omega_2 t,$ $\Delta U_{4n+3} = 0.3E_{Y2}' - K_R E_{(R\text{-}Y)2}'\cos\omega_2 t + K_B E_{(B\text{-}Y2)}'\sin\omega_2 t$ where $n = 0, 1, 2$ ...; $K_R$ and $K_B$ are the coefficients when $E_{(R\text{-}Y)2}'$ and $E_{(B\text{-}Y)2}40$ .

When $\omega_2$ is an odd harmonic of the quarter-line frequency $$\omega_2 = \frac{4K+1}{4}\omega_{line}$$

$$\Delta\ U_{2m} = 0.2E_{Y2} + K_2 A_2 \sin\ \left(\frac{4K+1}{4}\omega_{line}t - \psi_2\right),$$

$$\Delta\ U_{2m+1} = 0.2E_{Y2} + K_2 A_2 \sin\ \left(\frac{4K+1}{4}\omega_{line}t + \psi_2 - 90°\right)$$

where $\omega line = 2\pi f_{line}$;

$A_2 = \sqrt{E_{(R\text{-}Y)2}}^{12} + E_{(B\text{-}Y)2}^{12}$;

$$\psi = \arctan\frac{E'_{(R-Y)2}}{E'_{(B-Y)2}};$$

where $K_2$ is the compression coefficient for $A_2$.

The phase-difference quadrature modulation employed in the NIIR system provides for reliable protection against the action of the "differential phase" distortions on the colour subcarrier. Although the colour subcarrier with phasedifference modulation is somewhat more sensitive to the restriction of the sidebend frequency of the modulation band than the PAL signal, the simple decoder in the receiver is an advantage of the NIIR system — there is no local subcarrier-frequency oscillator for producing a colour sync signal or a "burst." On using the phase-difference modulation of the second subcarrier, the expressions for the chrominance signals are reduced to (for $\omega_2$ equal to the harmomic fo the quarter-line frequency $$\omega_2 = \frac{4n+1}{4} 2\pi f_{line})$$

in one line: $\Delta U_1 = 0.2E_{Y2}' + K_2 A_2 \sin(\omega_2 t + \delta_2)$, in the next line: $\Delta U_2 = 0.2E_{Y2}' = ]K_2 A_2 \sin(\omega_2 t - 90°)$ (making allowance for the fact that $\omega_o$ varies through 90° during the period of one line and through 180° during the period of two lines).

The chrominance signal of the second image of the stero pair in the NTSC system cam be shaped in a coder device, for example, by means of the shaper 16 (FIG. 1) whose simplifed block diagram is presented in FIG. 6.

The signals $E_{(R\text{-}Y)2}'$ and $E_{(B\text{-}Y)2}'$ are fed respectively to balanced modulators 25 and 26 which are also fed with the voltage of the additional colour subcarrier frequency $\omega_2$. Furthermore, during the blanking line interval the balanced modulator 26 is fed with a "burst" pulse (shown by an arrow in FIG. 6), that is a colour sync signal for synchronous detection at the frequency $CO_2$ in the receiver.

From the outputs of the balanced moudulators 25 and 26 the subcarrier voltages are fed to an adder 27, where is produced a quadrature-modulated chrominance signal of the second image of the stero pair. This signal is summed up with the video signal $E_{Y2}'$ in a mixer 28.

The use of the "burst" signal for shaping a reference subcarrier in the receiver in not necessary if the frequency $\omega_2$ is selected, for example, to be equal to half the frequency $\omega_o$ of the first subcarrier, which is fed to a constant-phase receiver every other line. However, since the phase shift $\omega_o(\approx 4.43$ MHz) in the communication channel can happen to be not equal to the double phase error at the frequency $\omega_o/2$ due to the action of the differential-phase distortions, such a method in combination with shaping of the chrominance signal at the frequency $\omega_2$ by the NTSC method seems to be not advantageous. Moreover, since the NTSC method is associated with distortions caused by assymetric suppression of the one sideband frequency of the modulation and and with $\omega_2 = \omega_o/2$ the frequency spectrum of the signal $\Delta\ U$ is wider than in the case from zero to 0.5 $f_o$, the transmission of this signal on the subcarrier frequency $\omega_o$ is rather difficult (according to the Kotelnikov therorem). Consequently, the selection of a frequency equal to half the frequency $\omega_o$ as $\omega_2$ is preferably combined with the shaping of the colour subcarrier of the second image by the method of the PAL system.

Figures 7, 8:
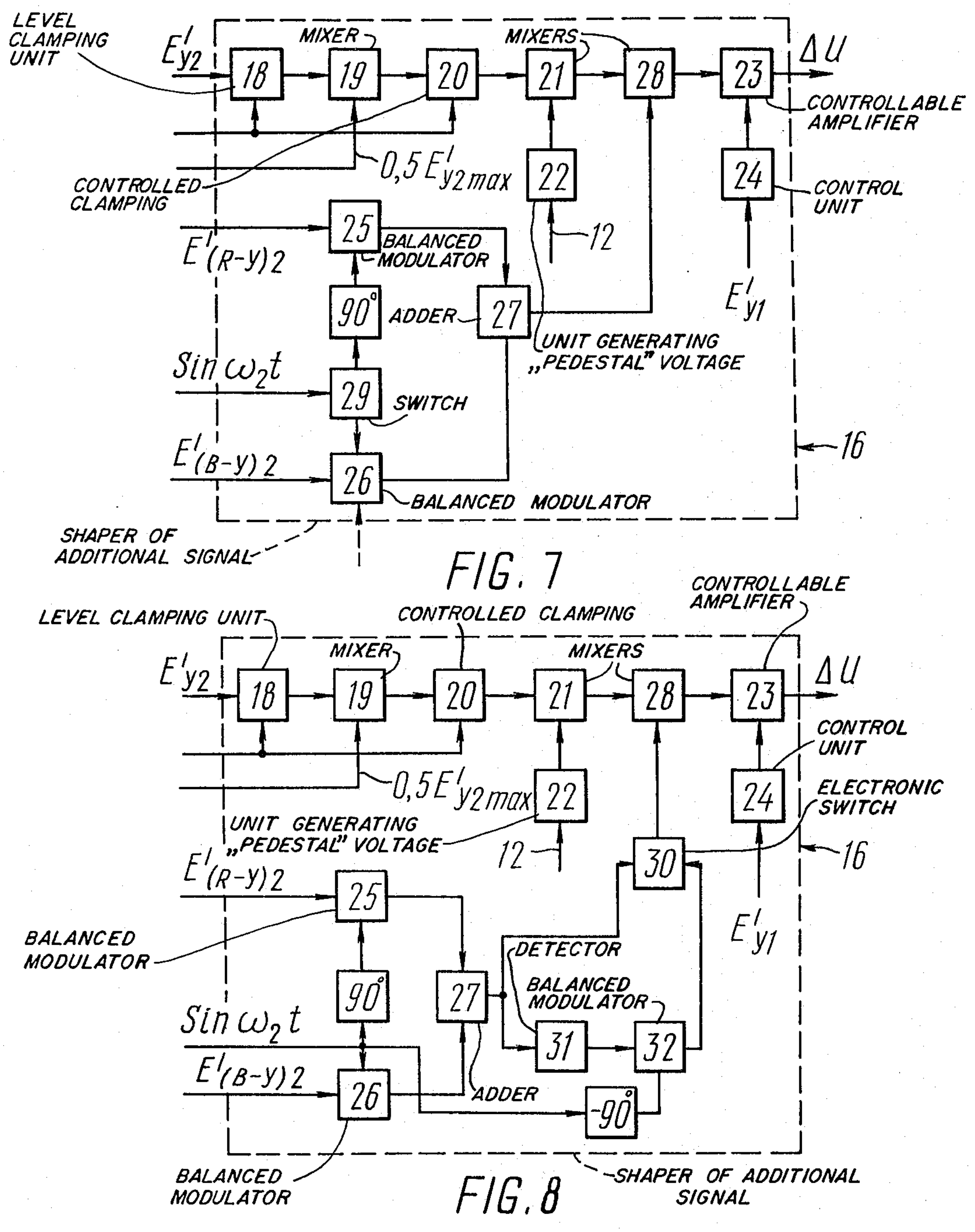
FIG. 7 shows an example of a simplified block diagram of shaping the additional signal with modulation of the second subcarrier by the PAL method.
FIG. 8 shows a simplified block diagram of shaping the additional signal with modulation of the second subcarrier by the NIIR method.

Such a signal can be shaped, for example, by means of the shaper 16 (FIG. 11) whose simplifed block diagram is givent in FIG. 7 (in this block diagram the symbols correspond to those employed in FIGS. 5 and 6). The difference of the block diagram in FIG. 7 from that shown in FIG. 6 consists in that the former is provided with a switch 29 controlling the subcarrier fed to the balanced modulators 25 and 26. In addition, the "burst" signal input is shown by a dashed line in FIG. 7 - for the case when $\omega_2$ is selected to be equal to $\omega_o/2$ and the "burst" signal is no longer necessary.

An example of a simplified block diagram of the device for shaping the second subcarrier with a phase-difference quadrature modulation is given in FIG. 8. The difference of the block diagram according to FIG. 8 from that shown in FIG. 6 consists in the following: from the adder 27 of a quadrature-modulated signal the colour subcarrier is fed to the inputs of an electronic switch 30 and an envelope dectector 31. The envelope video signal from the output of the detector 31 is fed to a balanced modulator 32 where it modulates the reference subcarrier $\omega_2$ applied to the modulator 32 through a network shifting the phase through 90°. From the output of the balanced modulator 32 the modulated subcarrier is fed to the second input of the switch 30. From the output of the switch 30 the subcarrier with or without phase modulation is fed to the mixer 28 every other line.

After shaping a composite additional signal, adding it to the envelope signal in the adder 11 of the block diagram according to FIG. 1, and modulating the subcarrier frequency by the resultant signal in the modulator 15, we obtain a composite signal of the modulated subcarrier which can be expressed in the form $$\left[\sqrt[4]{E_{(R-Y)1}{}^{12} + E_{(B-Y)1}{}^{12}} \pm (0.1E'_{Y2} + 0.2E'_{(R-Y)2}\cos\omega_2 t - 0.2E'_{(B-Y)2}\sin\omega_2 t)\right] \times \sin(\omega_o t + \arc\tan\frac{E'_{(R-Y)1}}{E'_{(B-Y)1}})$$

in one line and in the form $$\left[\sqrt[4]{E_{(R-Y)1}{}^{12} + E_{(B-Y)1}{}^{12}} \pm (0.1E'_{Y2} + 0.2E'_{(R-Y)2}\cos\omega_2 t + 0.2E'_{(B-Y)2}\sin\omega_2 t)\right] \times \sin\omega_o t$$

in the next line.

Figure 9:
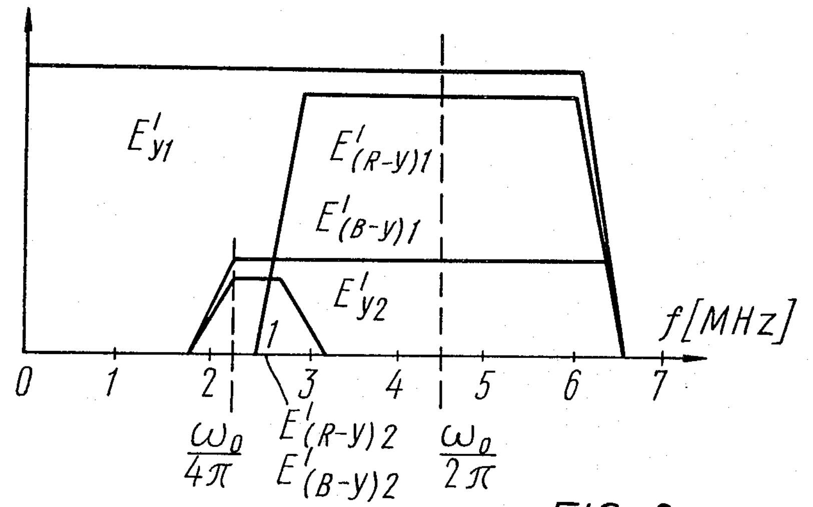
FIG. 9 shows an exemplary view of the frequency bands of a composite stereoscopic colour signal.

FIG. 9 shows an exemplary view of the frequency bands of the components of the composite signal of the stereoscopic colour television system according to the proposed method. The frequency band occupied by the signal $E_{Y1}'$ extends from zero to, for example, 6 MHz. The frequency band of the subcarrier frequency $\omega_o$ modulated by the colour-difference signals $E_{(R-Y)1}'$ and $E_{(B-Y)1}'$ is in the order of ±1.5 MHz of the subcarrier. The frequency band of the additional signal $\Delta U$ is assymetrical — for the signal $E_{Y2}'$ from − 2.2 MHz to +1.5 MHz with respect to the subcarrier $\omega_o$; in the lower part of this spectrum there is located the frequency band of the signals of the additional subcarrier $\omega_2$ modulated by the video signals $E_{(R-Y)2}'$ and $E_{(B-Y)2}'$ which, in turn, modulate the subcarrier $\omega_o$.

If the fundamental subcarrier frequency $\omega_o$ is selected to be equal to the odd harmonic of the quarter-line frequency (quarter-line offset), in the frequency spectrum of a composite stereoscopic colour television signal the energy of the video signal $E_{Y1}'$ will substantially be concentrated near the harmonics of the line frequency; the energy of the chrominance signals is substantially concentrated around the odd harmonics of the quarter-line frequency; the energy of the signal $E_{Y2}'$ is substantially concentrated around the odd harmonics of the three-quarter line frequency; the energy of the additional chrominance signals $E_{(R-Y)2}'$ and $E_{(B-Y)2}'$ is concentrated around the harmonics of the half-line frequency, provided that the frequency $\omega_2$ is an odd harmonic of the line frequency. This distribution of the energy of the signals through the frequency spectrum is approximate, since it depends on the method of shaping the chrominance signals on the additional subcarrier (for example, use of the NTSC and PAL methods). The accurate calculation of the spectrum of a composite signal of stereoscopic colour television by the proposed method requires to take allowance for the phase jump from line to line ($\gamma$ and O) of the fundamental colour subcarrier, and the final result will depend on the offset frequency selection.

The composite stereoscopic colour television signal shaped by the proposed method with the aid of a coder whose exemplary block diagrams are given in FIGS. 1, 5, 6, 7, 8, after having been processed at the transmitting side (mixing, video recording, special-effect use etc.), can be fed to the modulator of a television transmitter or to the input devices of ground or cosmic communication channels.

In the receiver the composite signal is taken from the detector (after having been amplified at radio frequency, mixed with the local oscillator signal, amplified at intermediate frequency by means of ordinary technique). Further utilization of this signal depends on the type of a television receiver: an ordinary monochrome set, a monochrome stereo set, an ordinary colour set or a stereoscopic colour set.

In an ordinary monochrome television receiver the composite signal, having been amplified by the video frequency, is fed to the kinescope modulator for reproduction of the monochrome (brightness) compatible image. In an ordinary colour receiver (i.e., that designed for compatible colour reception) the modulated subcarrier signal is separated from the composite signal and is fed to a delay line (64 μs) and to two multipliers from the outputs of which there are taken colour-difference signals. The block diagram and all the chrominance circuits of such a television receiver are known and common for a receiver of the quadratic version of the NIIR colour television system. No additional elements, compared with the known ones, are necessary in the chrominance unit of an ordinary colour television receiver of the NIIR system.

Different are only the decoder units of the monochrome and colour stereoscopic receivers, since they must include circuits for separating the information of the second image of the stereo pair.

Figure 10:
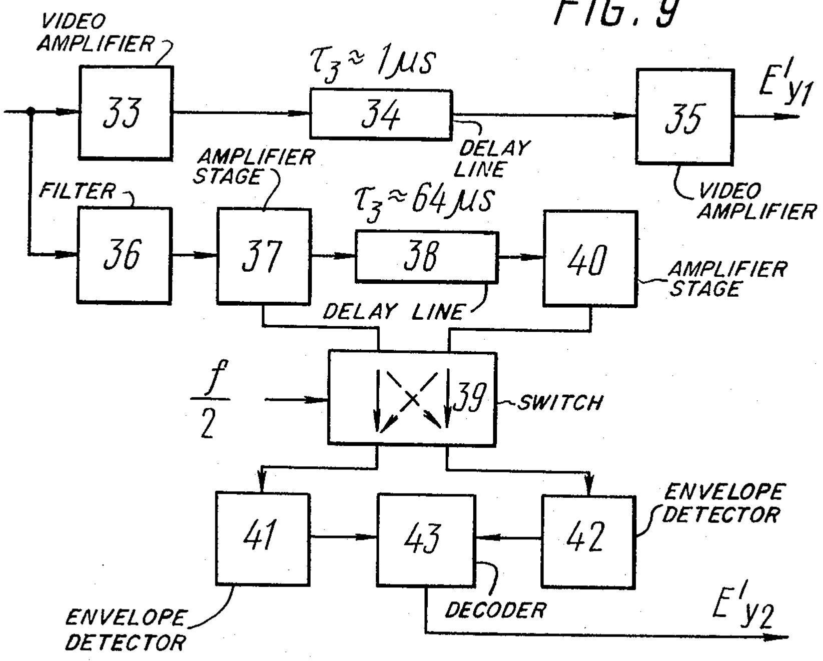
FIG. 10 shows a simplified block diagram of a decoder with separation off the luminance components of both images of the stereo pair from the composite signal (in a monochrome stereoscopic television receiver)

The separation of the luminance component of the second image of the stereo pair (in a monochrome stereoscopic television receiver) from the composite television signal produced by the proposed method can be effected, for example, by means of a decoder whose simplified block diagram is given in FIG. 10.

The composite television signal (by the video frequency) from the detector is fed through a rejection filter 33 (tuned to the frequency $\omega_o$) and a levelling delay line 34 ($\tau_3 \approx 1\ \mu s$) to a video amplifier 35 amplifying the signal of the first image of the stereo pair. In addition, the input composite signal is fed to a band-pass filter 36 where the signal of the modulated subcarrier is separated. The subcarrier voltage from the filter 36 is fed to an amplifier stage 37 from the outputs of which the signal is directed simultaneously to the input of a delay line 38 ($\tau_3 \approx 64\ \mu s$) and to a switch 39. From the output of the delay line 38 the signal amplified in the stage 40 is fed to the second input of the switch 39. Thus, at the inputs of the switch 39 there are the following signals, for example,

| 1st input | 2nd input |
|---|---|
| during the first line | |
| $(\sqrt{A} - \Delta U)\cos(\omega_o t + \psi)$ | $(\sqrt{A} + \Delta U)\cos\omega_o t$ |
| during the next line | |
| $(\sqrt{A} + \Delta U)\cos\omega_o t$ | $(\sqrt{A} - \Delta U)\cos(\omega_o t + \psi)$ |

The switch 39 controlled by the voltage of the frequency $f_{line}/2$ alternately connects the inputs to the outputs I and II so that at the output I there is always a signal, for example, $(\sqrt{A} + \Delta U)\cos\omega_o t$ while at the output II there is always a signal $(\sqrt{A} - \Delta U)\cos(\omega_o t + \gamma)$ From the outputs of the switch 39 these subcarrier signals are fed correspondingly to the inputs of the envelope detectors 41, 42 from the outputs of which there are taken video signals, such as $\sqrt{A} + \Delta U$ (from the detector 41)

and $-(\sqrt{A} - \Delta U) = \Delta U - \sqrt{A}$ (from the detector 42)

These signals are summed up and amplified by a video amplifier 43 from the output of which a video signal $E_{Y2}'$ is derived.

The block diagram in FIG. 10 does not illustrate the control circuits of the switch 39, since these circuits (triggers, identification network) are identical to those employed in the NIIR television receiver.

A stereoscopic colour television receiver can be built basing on two principles. In the first version only one image of the stereo pair is reproduced in colour, while the other image is monochrome. The decoder of such a stereoscopic colour television receiver will correspondingly be different from the stereoscopic monochrome television receiver whose block diagram is depicted in FIG. 10. An example of a simplified block diagram of the decoder of a stereoscopic colour television receiver with one monochrome and second colour images of the stereo pair is given in FIG. 11. The units in the block diagram of FIG. 11 identical to those shown in the block diagram of FIG. 10 are indicated by the same symbols.

Figure 11:
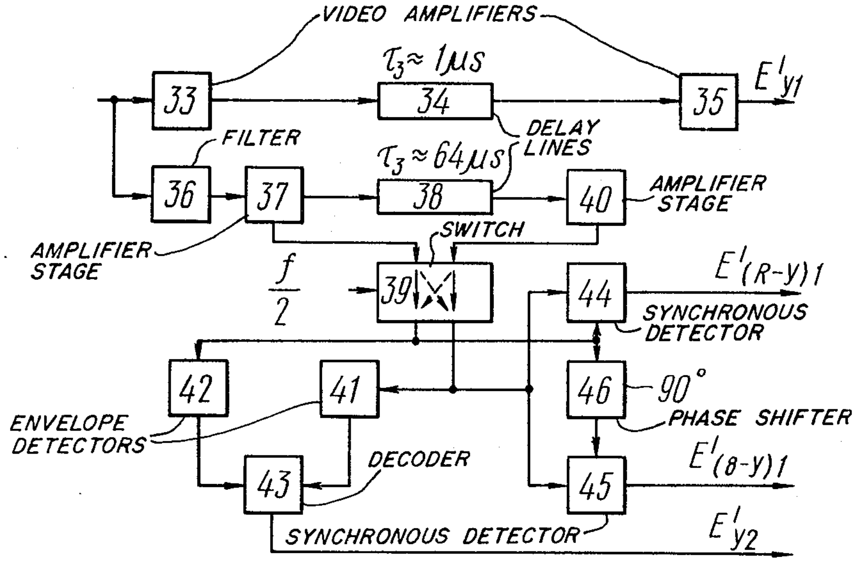
FIG. 11 shows an example of a simplified block diagram of the decoder of a stereoscopic colour television receiver having one colour and one monochrome images of the stereo pair.

The circuits and operating principles of the units 33 – 43 of the block diagram shown in FIG. 11 are quite identical to those of the same units shown in the block diagram of FIG. 10. The difference of the block diagram shown in FIG. 11 consists in the presence of circuits for separation of the colour-difference signals $E_{(R-Y)1}'$ and $E_{(B-Y)1}'$. The subcarrier signals from the outputs of the switch 39 are fed simultaneously to the inputs of the envelope detectors 41 and 42 to the inputs of two multipliers (synchronous detectors 44 and 45), one of these signals being fed to the multiplier 45 through a phase shifter 46 (90° at the frequency $\omega_o$). After multiplying the delayed and undelayed voltages of the subcarriers in the synchronous detectors 44 and 45 and suppressing the components of the frequency 2 $\omega_o$ by the filters, the colour-difference signals $E_{(R-Y)1}'$ and $E_{(B-Y)1}'$ are taken from the outputs of the detectors 44 and 45. It is obvious that the circuit for separation of the colour-difference video signals, as well as the method for their separation are completely identical to the method of separation of these signals in a receiver of the NIIR system.

When it is desirable to have both images of the stereo pair in a stereoscopic television receiver in colour, six signals must be separated from the composite signal in the decoder. The block diagram of the latter is correspondingly complicated, since it must include circuits for separating the signals $E_{(R-Y)2}'$ and $E_{(B-Y)2}'$.

The input signal, which is a sum of the voltages from the envelope detectors 41 and 42 (FIGS. 10 and 11), contains both the signal $E_{Y2}'$ and the voltage of the modulated colour subcarrier frequency $\omega_2$ (additional subcarrier). The separation of the signals $E_{(R-Y)2}'$ and $E_{(B-Y)2}'$, as well as $E_{Y2}'$, must be effected in the unit 43 (FIGS. 10 and 11).

The circuit diagram of the unit 43 depends substantially on the method of shaping the signal of the modulated additional subcarrier $\omega_2$ (the methods of the NTSC and NIIR type, the PAL method) and on the selection of the frequency $\omega_2$. When $\omega_2$ is not connected with $\omega_o$ through a simple relationship, the decoder network must include a quartz-crystal oscillator generating the subcarrier $\omega_2$ and circuits for phasing this oscillator by a "burst;" on the contrary, when $\omega_2$ is equal, for example, to a half the frequency $\omega_o$, the "burst" is not required and the quartz-crystal oscillator may be replaced by a frequency divider.

Figure 12:
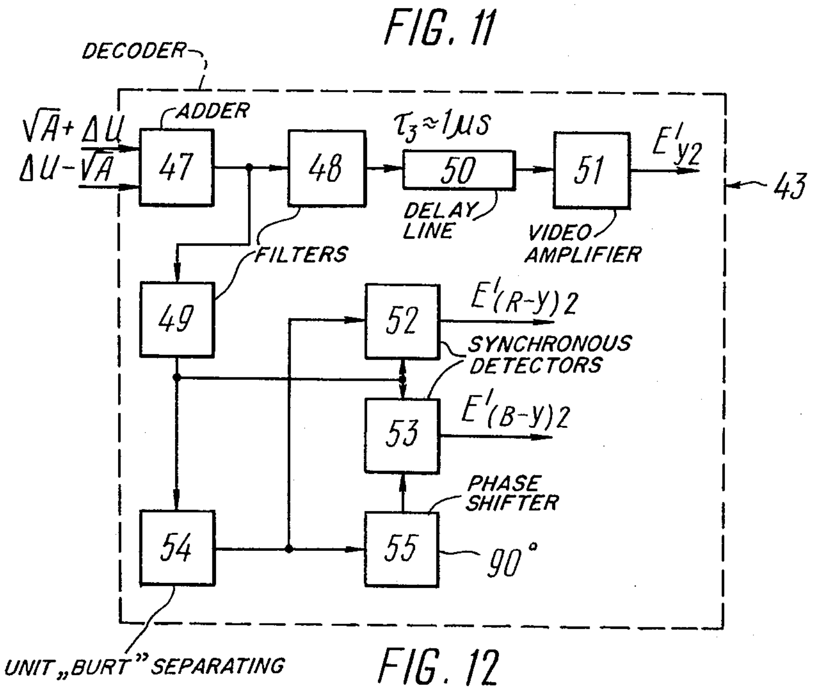
FIG. 12 shows an example of a block diagram of decoding the signals of the second image of the stereo pair in case of modulation of the additional subcarrier by the NTSC method.
Figure 13:
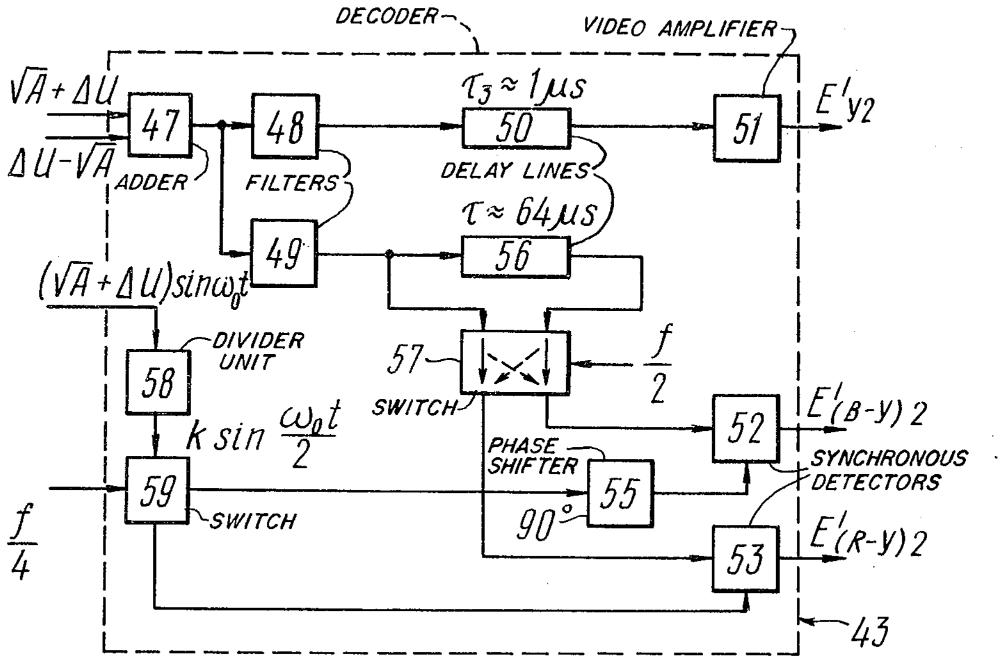
FIG. 13 shows an example of a simplified block diagram of decoding the signals of the second image of the stereo pair in case of modulation of the additional subcarrier by the PAL method.
Figure 14:
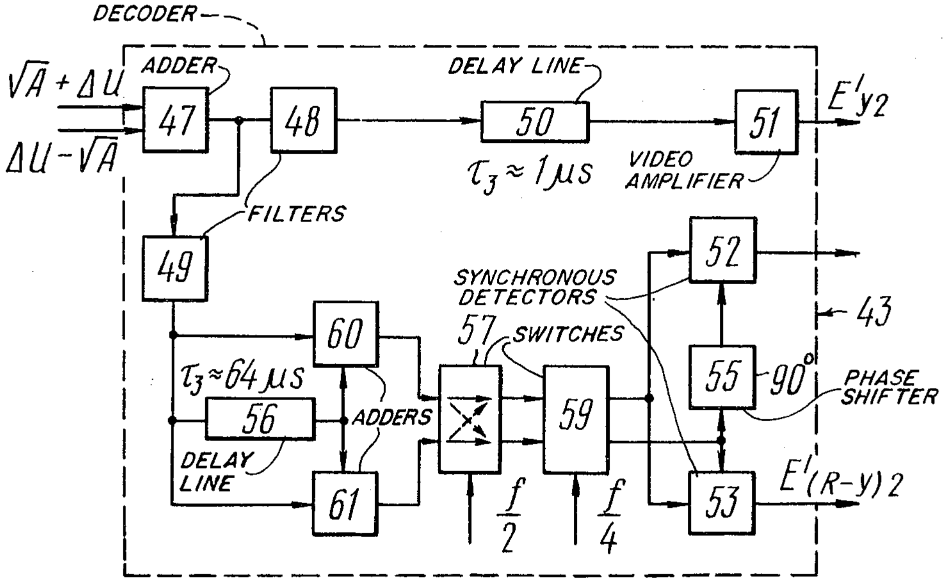
FIG. 14 is an example of a simplified block diagram of decoding of the signals of the second image of the stereo pair in case of modulation of the second subcarrier in the NIIR system.

Versions of simplified block diagrams of the decoders are illustrated in FIGS. 12, 13, and 14.

An example of a simplified block diagram of the decoder 43 (FIGS. 10, 11), for decoding the signals of the additional subcarrier modulated by NTSC method is given in FIG. 12. The output signals of the envelope detectors 41, 42 (FIGS. 10, 11) are fed to an adder 47 from the output of which the additional signal $2\Delta U$ composed of $0.4E_{Y2}'$ and $0.4E_{chrom}$ is fed to filters 48 and 49. After the filter 48, rejecting the additional subcarrier frequency $\omega_2$ (the signal $0.4E_{Y2}'$ passes through a levelling delay line 50 with $\tau_3 \approx 1\ \mu s$) and is fed to the input of a video amplifier 51 from the output of which there is taken a signal $E_{Y2}'$. The filter 49 is a band-pass filter with a centre frequency $\omega_2$. From the output of the filter 49 the signal of the modulated additional colour subcarrier is fed to synchronous detectors 52 and 53 and to a local oscillator unit 54 generating a subcarrier signal. In the unit 54 from the incoming signal there is separated a "burst," phasing the quartz-crystal oscillator of the reference subcarrier $\omega_2$. The reference subcarrier is fed to the second input of the synchronous detector 52 and through a phase shifter 55 (shifting the phase through 90°) is applied to the synchronous detector 53. From the outputs of the synchronous detectors 52, 53 there are taken colour-difference signals $E_{(R-Y)2}'$ and $E_{(B-Y)2}'$.

A simplified block diagram of a system for processing the additional signal in the detector 43 (FIGS. 10, 11) for the case of modulation of the subcarrier $\omega_2 = \omega_o/2$ by the PAL method is given in FIG. 13. The functions of the units 47, 48, 50, 51 and 49 in this block diagram are completely identical to those of the same units of the block diagram according to FIG. 12. Since in this case the modulation in the transmitting device is effected so that $\Delta U_{4n} = 0.2E_{Y2}' + K_R E_{(R-Y)2}'\cos\omega_2 t + K_B E_{(B-Y)2}'\sin\omega_2 t;$ $\Delta U_{4n+1} = 0.2E_{Y2}' + K_R E_{(R-Y)2}'\cos\omega_2 t - K_B E_{(B-Y)2}'\sin\omega_2 t;$ $\Delta U_{4+2} = 0.2E_{Y2}' - K_R E_{(R-Y)2}'\cos\omega_2 t - K_B E_{(B-Y)2}'\sin\omega_2 t;$ $\Delta U_{4n+3} = 0.2E_{Y2}' - K_R E_{(R-Y)2}'\cos\omega_2 t + K_B E_{(B-Y)2}'\sin\omega_2 t$ the following signals appear, for example, at the output of the filter 49 in $(m)$ line $= 2K_R E_{(R-Y)2}'\cos\omega_2 t;$ in the $(m+1)$ line $= -2K_B E_{(B-Y)2}'\sin\omega_2 t;$ in the $(m+2)$ line $= -2K_R E_{(R-Y)2}'\cos\omega_2 t;$ in the $(m+3)$ line $= 2K_B E_{(B-Y)2}'\sin\omega_2 t;$ in the $(m+4)$ line $= 2K_R E_{(R-Y)2}'\cos\omega_2 t$, etc.

The signals from the filter 49 are fed concurrently to the input of delay line 56 and to one of the inputs of a switch 57. The second input of the switch 57 is fed with a signal from the outpupt of the delay line 56 ($\tau_3 \approx 64\mu s$). At the outputs of the switch 57 we have the following signals, for example,

| 1st output | 2nd output |
|---|---|
| $2K_B E'_{(B-Y)2}\sin\omega_2 t;$ | $2K_R E'_{(R-Y)2}\cos\omega_2 t;$ |
| $2K_B E'_{(B-Y)2}\sin\omega_2 t;$ | $-2K_R E'_{(R-Y)2}\cos\omega_2 t;$ |
| $-2K_B E'_{(B-Y)2}\sin\omega_2 t;$ | $-2K_R E'_{(R-Y)2}\cos\omega_2 t;$ |
| $-2K_B E'_{(B-Y)2}\sin\omega_2 t;$ | $2K_R E'_{(R-Y)2}\cos\omega_2 t;$ |
| $2K_B E'_{(B-Y)2}\sin\omega_2 t;$ | $2K_R E'_{(R-Y)2}\cos\omega_2 t;$ |
| $2K_B E'_{(B-Y)2}\sin\omega_2 t;$ | $-2K_R E'_{(R-Y)2}\cos\omega_2 t,$ |

etc. These signals are fed correspondingly to the inputs of the synchronous detectors 52 and 53, whose other inputs are fed with the reference subcarrier signals (the signals to the detector 52 are fed through a 90° phase shifter).

From the detectors 52 and 53, after filtering out the components, colour-difference signals $E_{(R-Y)2}'$ and $E_{(B-Y)2}'$ are derived.

The reference voltage of the subcarrier $\omega_2 = \omega°/2$ is generated in a frequency divider unit 58 from the signal $$(\sqrt{A} + \Delta\, U)\sin\omega_o t$$

which is derived from the output of the switch 39 (FIG. 11). This signal is always different from zero in the presence of an additional signal; therefore, when the additional subcarrier is present at the inputs of the detectors 53 and 52, the signal of the fundamental subcarrier is automatically present at the input of the frequency divider 59. Since the additional subcarrier $\omega_2$ is selected to be equal to $\omega 0/2$, in the frequency divider unit 58 there is effected, for example, regenerative division of the frequency $\omega_o$ in two. Before feeding the signal of the frequency $\omega_o$ to the frequency divider unit 58, it is expedient to pass this signal through a comparatively narrow-band filter (to improve the signal-to-noise ratio). When $\omega_2$ $\omega o/2$, in the block diagram shown in FIG. 13 there can be used a device of the same type as the unit 54 (FIG. 12) including circuits for separating the "burst" of a frequency $\omega_2$, phasing circuits and a quartz-crystal oscillator generating signals with a frequency $\omega_2$.

The reference subcarrier voltage from the unit 58, before being applied to the synchronous detectors 52, 53, passes through a switch 59 where it is shifted by phase in a required manner (0° or 180°), the control of the polarity reversing being effected with a frequency $f_{line}/4$.

When the second chrominance subcarrier is transmitted with phase-difference quadrature modulation the "burst" signal, as well as the regeneration of the reference subcarrier in the receiver are no longer necessary. At the output of the adder summing up the signals of the fundamental modulated subcarrier there appears a signal equal from line to line $2\,\Delta\, U_{4n} = 0.4E_{Y2}' + K_2A_2\sin(\omega_2 + \gamma_2) + K_2A_2\sin\omega_2 t;$ $2\,\Delta\, U_{4n+1} = 0.4E_{Y2}' + K_2A_2\sin(\omega_2 t + \gamma_2) - K_2A_2\sin\omega_2 t;$ $2\,\Delta\, U_{4n+2} = 0.4E_{Y2}' - K_2A_2\sin(\omega_2 t + \gamma_2) - K_2A_2\sin\omega_2 t;$ $2\,\Delta\, U_{4n+3} = 0.4E_{Y2}' - K_2A_2\sin(\omega_2 t + \gamma_2) + K_2A_2\sin\omega_2 t$ etc.

If these signals are additionally delayed for a period of one line in the second chromaticity band (i.e., in the region $\omega_2$), and the delayed and undelayed signals of the modulated second subcarrier are impressed on two adders, in one of which the signals are summed up in phase and in the other they are summed up in antiphase, at the outputs of the adders there are produced the following subcarrier voltages:

| 1st adder | 2nd adder (substraction) |
|---|---|
| $2K_2A_2\sin(\omega_2 t + \psi_2)$; | $2K_2A_2\sin\omega_2 t$ |
| $-2K_2A_2\sin\omega_2 t$; | $2K_2A_2\sin(\omega_2 t + \psi_2)$; |
| $-2K_2A_2\sin(\omega_2 t + \psi_2)$; | $-2K_2A_2\sin\omega_2 t$; |
| $2K_2A_2\sin\omega_2 t$; | $-2K_2A_2\sin(\omega_2 t + \psi_2)$; |

-Continued

| 1st adder | 2nd adder (substraction) |
|---|---|
| $2K_2A_2\sin(\omega_2 t + \psi_2)$; | |
| $2K_2A_2\sin\omega_2 t$; | |
| $-2K_2A_2\sin\omega_2 t$; | $2K_2A_2\sin(\omega_2 t + \psi_2)$ |

An example of a simplified block diagram of the decoder 43 for decoding the signals of the additional subcarrier modulated by the NIIR method is illustrated in FIG. 14. The operation of the units 47, 48, 50, 51, 52, 56 in this block diagram is identical to the operation of the same units of the block diagram shown in FIG. 13. The signals of the modulated second subcarrier from the output of the band-pass filter 49 are fed to the inputs of the delay line 56, providing for a delay equal to the period of one line, and to the inputs of two adders 60 and 61, in one of which the delayed and undelayed signals are added and in the other these signals are substracted. Thus divided voltages of the subcarrier with the phase modulation, $A_2\sin(\omega_2 t + \gamma_2)$, and in the reference phase, $A_2\sin\omega_2 t$, are fed to the inputs of the switch 57, from the output of which they are fed to the synchronous detector 52 and 53 through a polarity switch 59, one of said signals being applied to the detector 52 through a phase shifter 55 (90° at a frequency $\omega_2$).

From the outputs of the detectors 52, 53, after filtering out the components of the frequency 2 $\omega_2$, there are taken colour-difference signals $E_{(R-Y)2}'$ and $E_{(B-Y)2}'$.

The realization of the prepared method of transmission of a composite stereoscopic colour television signal allows the following signals to be obtained at the receiving side:

— a luminance signal $E_{Y1}'$ of the first image of the stereo pair with a frequency band in the order of 6 MHz;

— colour-difference signals $E_{(R-Y)1}'$ and $E_{(B-Y)1}'$, each occupying a frequency band in the order of 1.5 MHz;

— a luminance signal $E_{Y2}'$ of the second image of the stereo pair in a frequency band in the order of 1.5 to 2.0 MHz;

— chrominance (colour-difference) signals $E_{(B-Y)2}'$ and $E_{(B-Y)2}'$ of the second image of the stereo pair in a frequency band in the order of 0.5 MHz.

Thus, the second by a of the stereo pair has horizontal resolution that is four times as low as the horizontal resolution of the first image. Moreover, the second image has nonuniform resolution in the horizontal and vertical directions; if the horizontal resolution of the luminance drops is reduced approximately by factor of four due to the limited frequency band of the signal $e_E'$, the vertical resolution is approximately twice as low (because one line, for example the $n$ line, is shaped from the signals $\Delta\, U_{n-1}$ and $\Delta\, U_n$, while the $n + 1$ line is shaped from the signals $\Delta\, U_n$ and $\Delta\, U_{n+1}$). Consequently, it is possible to use the known methods of changing the vertical resolution by the horizontal one to improve the latter. Owing to the fact that the signal $E_{Y2}'$ is the receiver is obtained from the sum of two $\Delta\, U$ (from the signals of two lines), the known methods of interlacing raster, for example, in this case must be slightly modified.

The switching is conveniently effected by means of a frequency associated with the fundamental subcarrier frequency $\omega_o \cong 2\pi \cdot 4.43$ MHz. If the frequencies $\omega_o/3$ are taken from the signal $E_{Y2}'$ at the transmitting side of the sampling while the duration of the sampling pulse is taken to be equal to or slightly less than one third of the sampling period, in which case in the first line the sampling pulse phase is taken equal to zero (by the leading edge), in the second line — in the order of 120°, in the third line — in the order of 240°, in the fourth line — again in the order of 120°, in the fifth line — zero, etc., we can improve the luminance resolution of the second image at the receiving side by gating the samples of the received signal.

After gating the signals at the transmitting side, we obtain a series of pulses.

in the first line — $M\ (\frac{\omega_o}{3};\ \psi = 0°)\ E_{Y2}'$ in the second line — $M\ (\frac{\omega_o}{3};\ \psi = 120°)\ E_{Y2}'$ in the third line — $M\ (\frac{\omega_o}{3};\ \psi = 240°)\ E_{Y2}'$ in the fourth line — $M\ (\frac{\omega_o}{3};\ \psi = 120°)\ E_{Y2}'$ in the fifth line — $M\ (\frac{\omega_o}{3};\ \psi = 0°)\ E_{Y2}$ where $M$ is pulse voltage of a frequency $\omega 0/3$ and phase $\psi$ with pulse duration of $$\tau_n < \frac{2\pi}{\omega_o}.$$

By passing these series of pulses through a low-pass filter with a pass band of the order of 1.5 – 2.0 MHz, we can obtain the signals
$E_{Y2}'\ (\psi = 0°)$, $E_{Y2}'\ (\psi = 120°)$, $E_{Y2}'\ (\psi = 240°)$,
$E_{Y2}\ (\psi = 120°)$, $E_{Y2}(\psi = 0°)$, $E_{Y2}'(\psi = 120°)$,
etc.

By employing in the receiver a signal generator producing pulses $M(\omega o/3)$ and an additional delay line delaying the signals for one line, from the separated signals $2\ \Delta\ U = 0.2E_{Y2}'(\psi = 0°) + 0.2E_{Y2}'(\psi = 120°)$;

$2\ \Delta\ U = 0.2E_{Y2}'(\psi = 120°) + 0.2E_{Y2}'(\psi = 240°)$, we can gate series of pulses (samples) that will be different in the first and second sum, thereby shaping a signal $E_{Y2}'$ which features better resolution than the signal corresponding to the frequency of 1.5 MHz.

What is claimed is:

1. A compatible stereoscopic color television system with phase-difference quadrature modulation of the color subcarrier in the frequency spectrum of the luminance signal by chrominance signals of the first image of the stereo pair and transmission of the signals of the second image of the stereo pair on the same subcarrier by its additional modulation by the luminance signals of the second image of the stereo pair so that the amplitude of the subcarrier in one line is equal to the sum of the amplitude of the modulating signal and the square root from the amplitude of the quadrature modulated subcarrier, and in the other line it is equal to the difference of said amplitudes, said additional modulation being effected to preserve the difference of the subcarrier phases in adjacent lines, during reception chrominance signals of said first image of the stereo pair being separated by multiplying the delayed and undelayed voltages of the subcarrier directly for one signal and with an additional 90° phase shift therebetween for the other signal, the chrominance signals of the second image of the stereo pair being separated by detecting the delayed and undelayed voltages and obtaining the difference of their envelopes.

2. A compatible system according to claim 1, wherein to ensure the transmission of information about the color of the second image of the stereo pair, an additional subcarrier is inserted into the frequency spectrum of said luminance signal of said image and quadrature modulated by two color-difference signals by the NTSC method, during reception the voltage of the modulated additional subcarrier is separated from the difference signal of the envelopes of the fundamental subcarrier by a bandpass filter and detected synchronously in two channels.

3. A compatible system according to claim 2, wherein to simplify the regeneration of the color-difference signals of the second image of the stereo pair, the frequency of said additional subcarrier is selected to be equal to half the frequency of the fundamental subcarrier, during reception a reference signal is shaped for synchronous detection of the modulated additional subcarrier by dividing the frequency of the signal of the modulated fundamental subcarrier from the lines with a reference phase.

4. A compatible system according to claim 1, wherein to reduce the level of cross-talk from the additional signal, the voltage of said luminance signal of the second image of the stereo pair is converted, before said signal modulates the subcarrier, into a bipolar voltage, for which purpose additional pulses having an amplitude equal to half the amplitude of the luminance signal are inserted into said signal, in the interval of the line blanking pulses, and the level is clamped to the tops of said additional pulses.

5. A compatible system according to claim 1, wherein to ensure the transmission of information about the color of the second image of the stereo pair, an additional subcarrier is inserted into the frequency spectrum of said luminance signal of said image and quadrature modulated by two color-difference signals, and wherein to improve the efficiency of protection of the signals of the additional subcarrier against the effects of distortions of the differential phase and parasitic suppression of one modulation sidebands types, the quadrature modulation of the additional subcarrier is performed with the reversal of polarity of one of the color-difference signals from line to line by the PAL method while during reception the color-difference signals of the second image of the stereo pair are regenerated correspondingly.

6. A compatible system according to claim 1, wherein to improve the immunity of the system to distortions of the differential phase type of the signals of said additional subcarrier and to improve the quality of color reproduction, the modulation of said additional color subcarrier is effected by relative quadrature modulation by the NIIR method, during reception the color-difference signals of the second image of the stereo pair are regenerated correspondingly.

* * * * *